US012155982B2

(12) United States Patent
Wyrobek et al.

(10) Patent No.: US 12,155,982 B2
(45) Date of Patent: Nov. 26, 2024

(54) ACOUSTIC PROBE ARRAY FOR AIRCRAFT

(71) Applicant: ZIPLINE INTERNATIONAL INC., South San Francisco, CA (US)

(72) Inventors: Keenan A. Wyrobek, Half Moon Bay, CA (US); Gavin K. Ananda Krishnan, San Carlos, CA (US); Brendan J. D. Wade, San Francisco, CA (US); Philip M. Green, Sunnyvale, CA (US); Thomas O. Teisberg, Menlo Park, CA (US); Rohit H. Sant, San Mateo, CA (US)

(73) Assignee: Zipline International Inc., South San Francisco, CA (US)

( * ) Notice: Subject to any disclaimer, the term of this patent is extended or adjusted under 35 U.S.C. 154(b) by 0 days.

(21) Appl. No.: 18/233,952

(22) Filed: Aug. 15, 2023

(65) Prior Publication Data

US 2023/0396909 A1 Dec. 7, 2023

Related U.S. Application Data

(63) Continuation of application No. 17/138,526, filed on Dec. 30, 2020, now Pat. No. 11,765,494.

(Continued)

(51) Int. Cl.
*H04R 1/08* (2006.01)
*H04R 1/02* (2006.01)

(52) U.S. Cl.
CPC ............. *H04R 1/086* (2013.01); *H04R 1/026* (2013.01); *H04R 1/028* (2013.01); *H04R 2410/07* (2013.01); *H04R 2499/13* (2013.01)

(58) Field of Classification Search
CPC ........ H04R 1/086; H04R 1/026; H04R 1/028; H04R 2410/07; H04R 2499/13; G01P 13/025; G01D 11/30
See application file for complete search history.

(56) References Cited

U.S. PATENT DOCUMENTS 2,663,518 A 12/1953 Glenn
3,444,508 A 5/1969 Granfors et al.
(Continued)

FOREIGN PATENT DOCUMENTS

CH 684490 A5 9/1994
DE 102010041733 A1 4/2012
(Continued)

OTHER PUBLICATIONS

Extended European Search Report dated Mar. 4, 2024 in connection with European patent application No. 20927946.2, 12 pages.
(Continued)

*Primary Examiner* — Jason R Kurr
(74) *Attorney, Agent, or Firm* — Dorsey & Whitney LLP

(57) ABSTRACT

Described herein is a sensor probe for association with a portion of an aircraft. The sensor probe includes a microphone assembly having a portion configured to receive audio signals. The sensor probe further includes a nosecone associated with the microphone assembly. The nosecone assembly is configured to shield the portion of the microphone assembly from noise generated by direct impact of an airflow for a plurality of local flow angles. In some examples, the nosecone includes a tip and a body portion, wherein a diameter of the body portion of the nosecone is smaller than a length of the nosecone and the nosecone is configured to mitigate drag of the sensor probe in an airflow. In some examples, the nosecone further includes a mount assembly downstream of the nosecone and positioned rearward of the tip and including a mount aperture in fluid communication within an external environment of the sensor probe and configured to direct airflow from the external environment rearward, the microphone positioned downstream of the mount assembly and secured in a perpendicular orientation relative to a direction of airflow exiting the
(Continued)

mount aperture, and an acoustic corridor to transmit the audio signal extending from an opening at an external environment of the sensor probe to the microphone via the mount aperture, wherein the opening is defined by a side of the nosecone.

20 Claims, 11 Drawing Sheets

Related U.S. Application Data

(60) Provisional application No. 63/082,869, filed on Sep. 24, 2020, provisional application No. 63/021,633, filed on May 7, 2020, provisional application No. 62/984,266, filed on Mar. 2, 2020, provisional application No. 62/955,946, filed on Dec. 31, 2019.

(56) References Cited

U.S. PATENT DOCUMENTS

| | | | | |
|---|---|---|---|---|
| 3,476,208 | A | 11/1969 | Sellman et al. | |
| 3,893,061 | A | 7/1975 | Slawsky et al. | |
| 3,964,694 | A | 6/1976 | Metzger et al. | |
| 4,106,740 | A | 8/1978 | Lloyd et al. | |
| 4,137,992 | A | 2/1979 | Herman | |
| 4,363,937 | A * | 12/1982 | Bruna | H04R 1/086 381/360 |
| 4,428,549 | A | 1/1984 | Halliday et al. | |
| 4,509,151 | A | 4/1985 | Anderson | |
| 4,622,657 | A | 11/1986 | Clare | |
| 4,689,821 | A | 8/1987 | Salikuddin et al. | |
| 4,811,308 | A | 3/1989 | Michel | |
| 4,831,874 | A | 5/1989 | Daubin et al. | |
| 4,926,171 | A | 5/1990 | Kelley | |
| 4,966,252 | A | 10/1990 | Drever | |
| 4,974,213 | A | 11/1990 | Siwecki | |
| 5,062,085 | A | 10/1991 | Andrews | |
| 5,111,400 | A | 5/1992 | Yoder | |
| 5,150,336 | A | 9/1992 | Sullivan et al. | |
| 5,177,316 | A | 1/1993 | Honigsbaum | |
| 5,339,287 | A | 8/1994 | Bauer | |
| 5,410,519 | A | 4/1995 | Hall et al. | |
| 5,477,506 | A | 12/1995 | Allen | |
| 5,563,849 | A | 10/1996 | Hall et al. | |
| 5,575,438 | A | 11/1996 | McGonigle et al. | |
| 5,617,371 | A | 4/1997 | Williams | |
| 5,666,433 | A | 9/1997 | Wehner | |
| 5,699,437 | A | 12/1997 | Finn | |
| 5,748,143 | A | 5/1998 | Melvin et al. | |
| 5,808,243 | A | 9/1998 | McCormick et al. | |
| 5,861,846 | A | 1/1999 | Minter | |
| 5,901,232 | A | 5/1999 | Gibbs | |
| 5,909,409 | A | 6/1999 | Barber et al. | |
| 5,995,445 | A | 11/1999 | Whitesell et al. | |
| 6,034,760 | A | 3/2000 | Rees | |
| 6,201,482 | B1 | 3/2001 | Schiefele et al. | |
| 6,288,973 | B1 | 9/2001 | Joynes | |
| 6,588,701 | B2 | 7/2003 | Yavnai | |
| 6,621,764 | B1 | 9/2003 | Smith | |
| 6,705,573 | B2 | 3/2004 | McDonnell | |
| 6,760,449 | B1 | 7/2004 | Matsuo | |
| 6,795,772 | B2 | 9/2004 | Lin et al. | |
| 6,804,607 | B1 | 10/2004 | Wood | |
| 6,857,601 | B2 | 2/2005 | Akahori | |
| 6,859,420 | B1 | 2/2005 | Coney et al. | |
| 6,970,796 | B2 | 11/2005 | Tashev | |
| 7,079,450 | B2 | 7/2006 | Breed et al. | |
| 7,149,147 | B1 | 12/2006 | Goldman et al. | |
| 7,209,221 | B2 | 4/2007 | Breed et al. | |
| 7,228,232 | B2 | 6/2007 | Bodin et al. | |
| 7,372,773 | B2 | 5/2008 | Horak | |
| 7,383,106 | B1 | 6/2008 | Coonse | |
| 7,457,619 | B2 | 11/2008 | Ariyur et al. | |
| 7,548,488 | B2 | 6/2009 | Horak et al. | |
| 7,606,115 | B1 | 10/2009 | Cline et al. | |
| 7,720,232 | B2 | 5/2010 | Oxford | |
| 7,751,976 | B2 | 7/2010 | Matuska et al. | |
| 7,818,127 | B1 | 10/2010 | Duggan et al. | |
| 7,975,959 | B2 | 7/2011 | Perry et al. | |
| 7,991,167 | B2 | 8/2011 | Oxford | |
| 8,534,112 | B2 * | 9/2013 | Huertos Sanz | G01P 13/025 73/866.5 |
| 8,809,755 | B1 | 8/2014 | Patel et al. | |
| 2001/0023582 | A1 | 9/2001 | Nagel | |
| 2002/0110250 | A1 | 8/2002 | Schwald | |
| 2003/0185410 | A1 | 10/2003 | June et al. | |
| 2004/0105557 | A1 | 6/2004 | Matsuo | |
| 2004/0165736 | A1 | 8/2004 | Hetherington et al. | |
| 2004/0252845 | A1 | 12/2004 | Tashev | |
| 2005/0169489 | A1 | 8/2005 | Cleckler et al. | |
| 2005/0271221 | A1 | 12/2005 | Cerwin | |
| 2010/0121574 | A1 | 5/2010 | Ariyur et al. | |
| 2015/0304754 | A1 * | 10/2015 | Akino | H04R 1/086 381/361 |
| 2016/0063987 | A1 | 3/2016 | Xu et al. | |
| 2019/0039724 | A1 | 2/2019 | Konishi et al. | |
| 2020/0393562 | A1 | 12/2020 | Staudinger et al. | |

FOREIGN PATENT DOCUMENTS

| | | | |
|---|---|---|---|
| EP | 0715801 | B1 | 11/2003 |
| EP | 1571875 | A2 | 9/2005 |
| EP | 1946606 | B1 | 11/2010 |
| GB | 381730 | A | 10/1932 |
| GB | 2085821 | A | 5/1982 |
| GB | 2309301 | A | 7/1997 |
| GB | 2350425 | B | 3/2003 |
| GB | 2380244 | A | 4/2003 |
| JP | H09500253 | A | 1/1997 |
| JP | H1098791 | A | 4/1998 |
| JP | 2002039851 | A | 2/2002 |
| JP | 2006319789 | A | 11/2006 |
| KR | 100520786 | B1 | 10/2005 |
| KR | 20060011064 | A | 2/2006 |
| WO | 9602905 | A1 | 2/1996 |
| WO | 0167115 | A2 | 9/2001 |
| WO | 2005006009 | A2 | 1/2005 |
| WO | 2005012079 | A1 | 2/2005 |
| WO | 2006113104 | A2 | 10/2006 |
| WO | 2018081559 | A1 | 5/2018 |

OTHER PUBLICATIONS

International Search Report and Written Opinion issued in International Patent Application No. PCT/US2020/067552 on Sep. 28, 2021 (11 pages).

Office Action dated Jun. 6, 2023 in connection with Japanese patent application No. 2022-565735, 11 pages including English translation.

Office Action dated Oct. 31, 2023 in connection with Japanese patent application No. 2022-565735, 9 pages including English translation.

* cited by examiner

ACOUSTIC PROBE ARRAY FOR AIRCRAFT

CROSS-REFERENCE TO RELATED APPLICATIONS

This application is a continuation of U.S. patent application Ser. No. 17/138,526, filed Dec. 30, 2020, now U.S. Pat. No. 11,765,494, which claims priority to U.S. Provisional Patent Application No. 62/955,946, filed Dec. 31, 2019, U.S. Provisional Patent Application No. 62/984,266, filed Mar. 2, 2020, U.S. Provisional Patent Application No. 63/021,633, filed May 7, 2020, and U.S. Provisional Patent Application No. 63/082,869, filed Sep. 24, 2020.

FIELD

The described embodiments relate generally to aircraft, and more particularly, to sensor arrays for aircraft.

BACKGROUND

Conventional aircraft detection systems, such as radar, may be difficult or cost prohibitive to incorporate into smaller aircraft, such as unmanned aircraft. Further, regulations may require unmanned aircraft to maintain a spherical detection zone, detecting other aircraft in every direction relative to the aircraft. As conventional aircraft detection systems may not be developed for such detection, implementing conventional systems for spherical detection may be technically complex and expensive.

Conventional aircraft, including commercial aircraft and general aviation aircraft, follow established airspace rules to avoid collision with other aircraft. For example, in general, each aircraft is responsible for the airspace in front of the aircraft. In some airspaces, unmanned aerial vehicles (UAVs) may be required to maintain spherical coverage, meaning that the UAV must monitor airspace in each direction for intruding aircraft. UAVs may be responsible for moving out of the way of intruding aircraft, so that other aircraft do not encounter UAVs during flight. Conventional aircraft detection systems, such as radar, may be optimized for monitoring the area in front of an aircraft. While such systems may be altered to provide spherical coverage, a system providing such coverage may prohibitively heavy relative to a UAV. Further, conventional detection systems may have difficulty with long-range detection, which gives a UAV less time to detect other aircraft and alter its flight path to avoid other aircraft.

SUMMARY

In one example, a sensor probe for association with a portion of an aircraft is disclosed. The sensor probe includes a microphone assembly having a portion configured to receive audio signals. The sensor probe further includes a nosecone associated with the microphone assembly. The nosecone is configured to shield the portion of the microphone assembly from noise generated by direct impact of an airflow for a plurality of local flow angles.

In another example, an aircraft is disclosed. The aircraft includes an arrangement of sensor probes configured to detect an audio signal. Each sensor probe of the arrangement is configured to manipulate an airflow for a plurality of local flow angles to reduce noise from direct flow for the audio signal.

In another example, a method is disclosed. The method includes receiving an airflow along a nosecone of a sensor probe. The method further includes detecting an audio signal associated with an external environment of the airflow using a microphone assembly. The method further incudes reducing noise from direct flow for the audio signal for a plurality of local flow angles.

In one example, an aerial vehicle including an aircraft sensor probe to detect an audio signal is disclosed. The aircraft sensor includes a nosecone including a tip and a body portion, wherein a diameter of the body portion of the nosecone is smaller than a length of the nosecone and the nosecone is configured to mitigate drag of the sensor probe in an airflow, a mount assembly downstream of the nosecone and positioned rearward of the tip and including a mount aperture in fluid communication within an external environment of the sensor probe and configured to direct airflow from the external environment rearward, a microphone positioned downstream of the mount assembly and secured in a perpendicular orientation relative to a direction of airflow exiting the mount aperture, and an acoustic corridor to transmit the audio signal extending from an opening at an external environment of the sensor probe to the microphone via the mount aperture, wherein the opening is defined by a side of the nosecone.

In one example, an aircraft sensor to detect an audio signal is disclosed. An aircraft sensor probe includes a nosecone including a tip and a body portion, wherein a diameter of the body portion of the nosecone is smaller than a length of the nosecone and the nosecone is configured to mitigate drag of the sensor probe in an airflow, a mount assembly downstream of the nosecone defining a mount aperture extending therethrough, an audio sensor coupled to the mount assembly and positioned rearward of the tip and downstream of the nosecone, an acoustic corridor to transmit the audio signal extending from an external environment of the sensor probe to the audio sensor, an opening defined by the nosecone and fluidly coupled with the acoustic corridor, an intermediary media positioned at the acoustic corridor arranged between the nosecone and the audio sensor, and wherein the sensor probe receives the airflow for a plurality of local flow angles and reduces noise from direct flow for the audio signal.

In one example, an aircraft is disclosed. The aircraft includes a fuselage, a first wing extending from the fuselage, a second wing extending from the fuselage opposite the first wing, a propeller, and one or more sensor probes to detect an audio signal including a nosecone including a tip and a body portion, wherein the nosecone is configured to mitigate drag of the sensor probes in the airflow, an audio sensor positioned rearward of the tip and downstream of the nosecone, an acoustic corridor to transmit the audio signal extending from an opening at an external environment of the sensor probe to the audio sensor, and a mount assembly downstream of the nosecone and defining a mount aperture extending therethrough, the microphone assembly mount coupled with the audio sensor.

In addition to the exemplary aspects and embodiments described above, further aspects and embodiments will become apparent by reference to the drawings and by study of the following description.

DETAILED DESCRIPTION

Figure 1A:
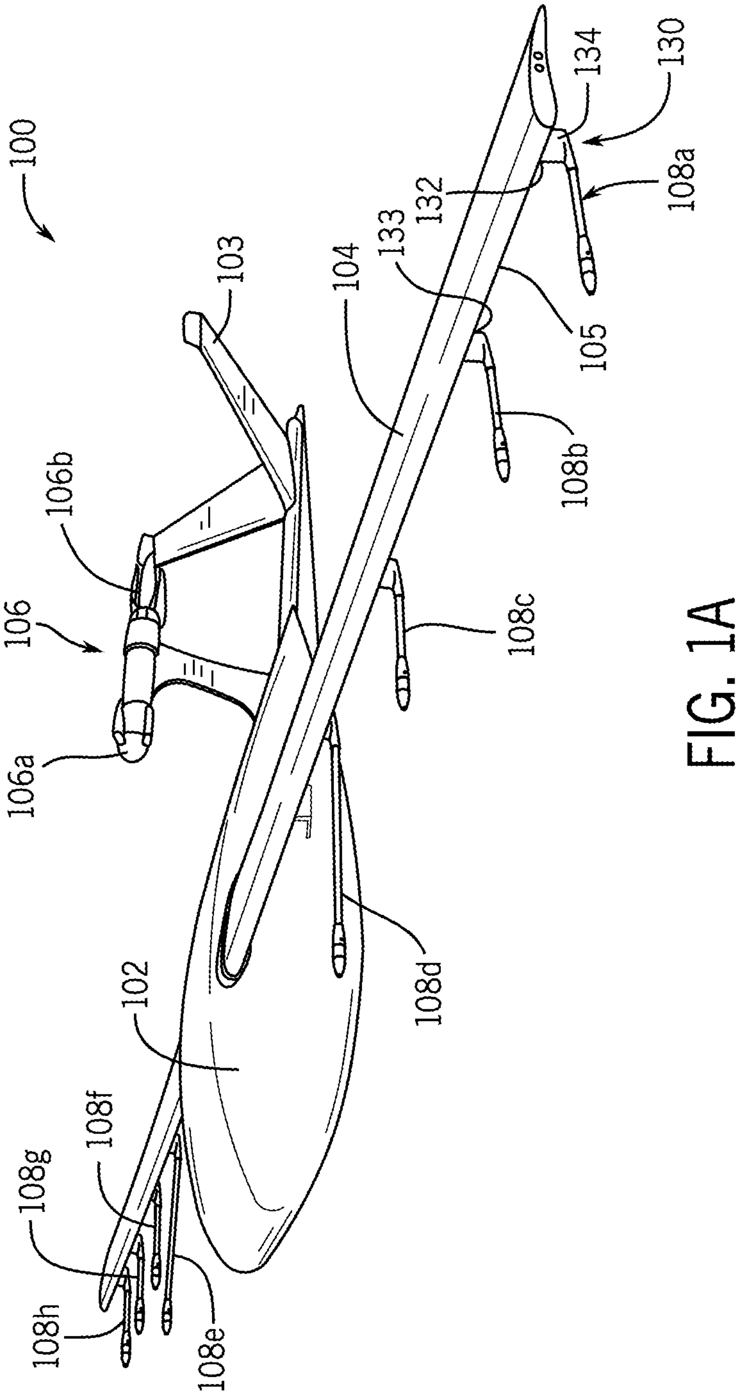
FIG. 1A depicts an isometric view of an aircraft having one or more peripheral assemblies.

The description that follows includes sample systems, methods, and apparatuses that embody various elements of the present disclosure. However, it should be understood that the described disclosure may be practiced in a variety of forms in addition to those described herein.

The following disclosure describes systems and techniques to facilitate detection of acoustic signals from an aircraft. A sample aircraft may include an unmanned aerial vehicle (UAV). The systems and techniques described herein are also applicable to piloted aerial vehicles and/or other vehicles or moving objects more generally. The acoustic signals may be detected using a sensor probe or other assembly that includes a microphone device. The sensor probe may be arranged to detect the acoustic signals during operation of the aircraft. The aircraft may include a detection and avoidance system that uses the acoustic signals to determine information associated with an environment of the aircraft, and can distinguish between audio signals produced by intruders, such as other aircraft, and audio signals produced by the aircraft's own engines (or flight system), distinguish between audio signals produced by intruders and natural sources (e.g., wind or weather noise), and determine spatial information of signals (e.g., provide a location estimation of the intruder relative to the aircraft). One such detection and avoidance system is described in U.S. Patent Application No. 63/082,838, entitled "ACOUSTIC BASED DETECTION AND AVOIDANCE FOR AIRCRAFT," of which is incorporated by reference herein.

The sensor probes of the present disclosure facilitate the detection of acoustic signals for use in an acoustic detection and avoidance system or other on-board aircraft systems. In one embodiment, a sample sensor probe may be a generally elongated structure that extends from a portion of the aircraft, such as a wing assembly, fuselage, or other portion of the aircraft. The sensor probe may include a microphone assembly having a portion that is configured to receive audio signals. A nosecone may be associated with the microphone assembly and configured to shield the portion of the microphone assembly from noise or other unwanted audio signals generated by direct impact of an airflow on the sensor probe. In some cases, the nosecone can be configured to shield the portion of the microphone assembly for a plurality of local flow angles to facilitate removal of the directional aspects of the airflow relative to the portion of the microphone assembly. The nosecone may also function as an environmental barrier between the microphone assembly and the external environment, shielding the microphone assembly from moisture, debris, radiation, and/or other contaminants.

The nosecone may also be configured to shield the microphone assembly while allowing the microphone assembly to have sufficient audial exposure to the external environment. For example, the nosecone may be configured to maintain an acoustic pathway for the audio signal between the portion of the microphone assembly and an external environment of the sensor probe. In one example, the nosecone can define an internal volume and a series of apertures, which may be defined as slits, that define openings into the internal volume. The portion of the microphone assembly may be arranged within the internal volume. The series of slits may therefore define the acoustic pathway to the microphone assembly held in the internal volume. In some cases, the nosecone is configured to mitigate a transition or separation of the flow until downstream of the series of slits, for the plurality of flow angles, to further facilitate the reduction of noise.

In another example, the nosecone can be formed at least partially from a barrier material. The barrier material may generally shield the microphone from weather and debris. The barrier material can include or be fully or partially formed from an acoustically transparent material. The nosecone can include a section that is substantially transparent to audio signals of interest (e.g., audio produced by intruders, which can be in the 0-500 Hz or other appropriate range). The nosecone can thus selectively attenuate unwanted signals (noise) and provide an acoustic path that minimizes the production of additional unwanted signals or the distortion of the unwanted signals. While many materials are possible and contemplated herein, the acoustically transparent material may be formed from a porous material, such as a porous, hydrophobic plastic. The acoustically transparent material may be used to shield the microphone from weather and debris, but allow acoustic signals to be transmitted to the microphone. For example, the acoustically transparent material may define a tortuous pathway such that water cannot flow through the material, but sound waves are able to flow therethrough. Additionally, the acoustically transparent material may be selected to prevent a direct impact of flow angles of air and sound on the microphone, further reducing noise. Optionally, the material may also assist in reorienting the air flow, such that the air flow does not generate noise or the noise is reduced to the desired sound frequencies to be detected by the microphone The microphone assembly may be arranged within the sensor probe to enhance the detection of acoustic signals for use with a detection and avoidance system. The microphone assembly may include one more microphone devices, pressure transducers and/or any appropriate sensors that are configured to detect audio-frequency air pressure fluctuations. In one example, the microphone assembly may be orientated within the nosecone along a direction substantially perpendicular to a direction of flow encountered by the nosecone or otherwise perpendicular to a direction of travel of the aircraft. The substantially perpendicular arrangement permits the microphone assembly to be arranged along a centerline of a circular nosecone. This arrangement may also help cancel or otherwise mitigate pressure fluctuations at the microphone assembly that may contribute to undue noise.

The microphone assembly can be mounted at a rear section of the nosecone and extend along a substantially cylindrical cross-section, downstream of a tip of nosecone. In some cases, a microphone assembly mount, stiffener, and/or other structures may be fitted substantially into the nosecone to mount the microphone assembly in the desired orientation. The microphone mount may also include an alignment feature engageable with the microphone assembly to facilitate rotational positioning. This may be beneficial in order to align the microphone device with an acoustic corridor in the sensor probe that is off-center or otherwise not concentric with a centerline of the probe.

The sensor probes described herein may be implemented in an acoustic array for the aircraft. In some cases, it may be beneficial to obtain acoustic signals from multiple sensors during operation of the aircraft, for example, to support the operation of the detection and avoidance system. The multiple acoustic signals can be used together to detect a location of the intruder in multiple directions relative to the aircraft, e.g., 360 degrees, and/or to facilitate the substation of unwanted noise. The multiple sensor probes may be arranged with the aircraft to optimize the location detection. In one example, an arrangement of sensor probes may be connected to and extending from a wing assembly of the aircraft. The sensor probes may be spaced apart along the wing assembly to facilitate acoustic detection at multiple locations. The sensor probes may also extend elongated from a leading edge of the wing assembly, which may help reduce aeroacoustics noise from turbulent flow associate with the other components of the aircraft.

In some cases, the sensor probes may extend at different lengths from the leading edge, which may be determined based on a position of the probe relative to the fuselage. For example, a first sensor probe may extend a first length from the leading edge and a second sensor probe may extend a second, shorter length from the leading edge, the second sensor probe being further away from the fuselage than the first sensor probe. In one example, the aircraft may include wing portions extending from opposing sides of the fuselage, each with a first sensor probe at a first length and three additional sensor probes at a second, shorter length. Additionally or alternatively, the sensor probes may be orientated at different angles relative to the wing assembly. For example, the sensor probes may be orientated at different angles in order to align with a local flow angle along the wing. The sensor probes may also be arranged to extend from various different surfaces of the wing assembly, such as extending from a top surface, a bottom surface, tip and/or other portion of the wing assembly. Variation in probe geometry may allow software to receive a wider range of information regarding a detected acoustic signal. The detection and avoidance system may utilize the wider range of information to enhance the accuracy of intruder detection, as one example.

Turning now to the figures, FIG. 1A depicts an isometric view of an aircraft 100. The aircraft 100 is shown as a fixed-wing UAV. The aircraft 100 may include a fuselage 102, a tail 103, a wing assembly 104, and a propulsion system 106. The propulsion system 106 includes a front propeller 106*a* and a rear propeller 106*b*. It will be appreciated that the aircraft 100 may include other components and/or encompass other variations of aerial and more generally moving vehicles, including piloted aircraft and/or other types of UAVs, such as helicopter-type UAVs.

Figure 9:
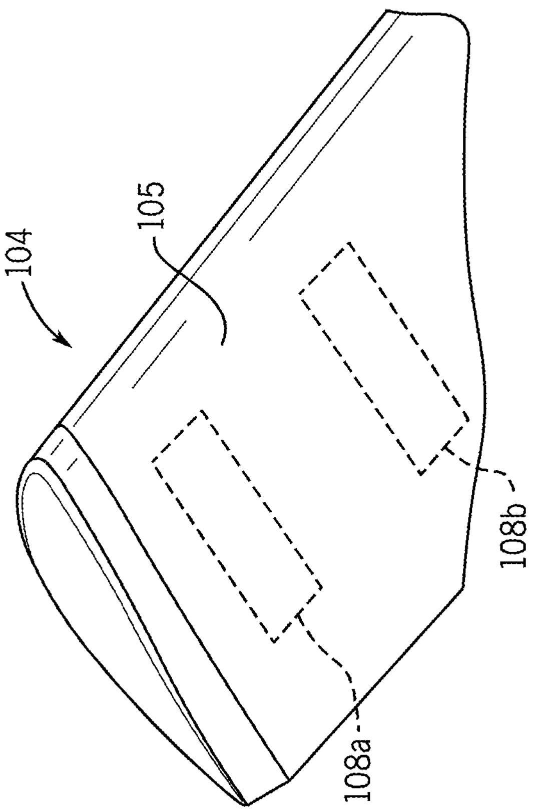
FIG. 9 depicts an underside of a wing assembly having one or more microphone assemblies included therein.

The aircraft 100 may be equipped with an arrangement of peripheral assemblies, such as sensor probes. In the FIG. 1A example, the peripheral assemblies are sensor probes and the aircraft 100 includes eight sensor probes: a first sensor probe 108*a*, a second sensor probe 108*b*, a third sensor probe 108*c*, a fourth sensor probe 108*d*, a fifth sensor probe 108*e*, a sixth sensor probe 108*f*, a seventh sensor probe 108*g*, and an eighth sensor probe 108*h*. However, it should be noted that the number and arrangement of probes may be varied as needed, e.g., depending on the sensitivity of the detection and avoidance software, size and type of the UAV, sensitivity of the probes, and the like. The sensor probes 108*a*-108*h* may be connected to a portion of the aircraft 100. In the example of FIG. 1A, the sensor probes 108*a*-108*h* are connected to an underside 105 of the wing assembly 104. The sensor probes 108*a*-108*h* can be passively and/or actively manipulated in order to face in to an airflow when in use. In other examples, more or fewer sensor probes may be used. In some cases, the sensor probes may be held substantially within the aircraft 100 itself rather than define an elongated structure, as shown in FIG. 9, in which the first sensor probe 108*a* and the second probe 108*b* are held within the wing assembly 104.

Figure 1B:
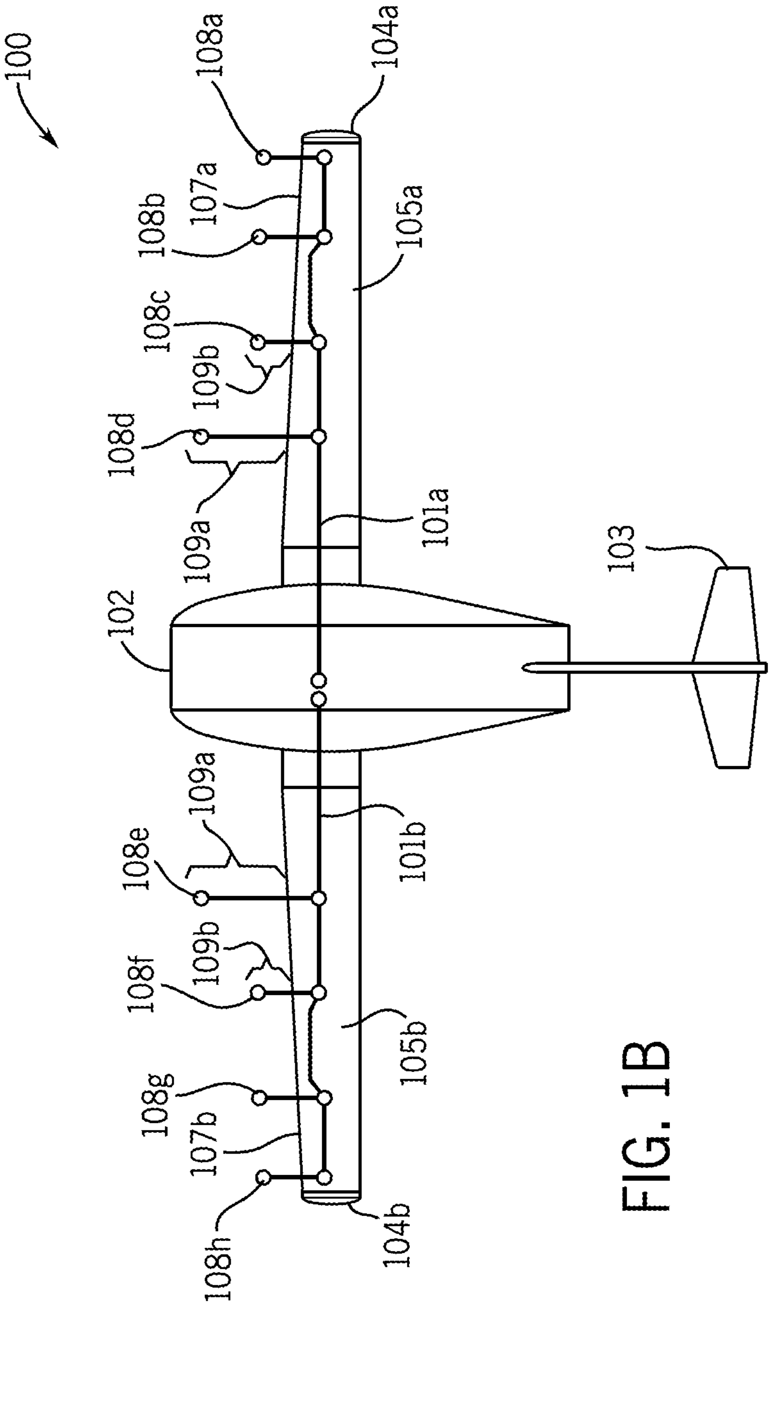
FIG. 1B depicts a bottom view of the aircraft of FIG. 1A having an arrangement of sensor probes.

With reference to FIG. 1B, a bottom schematic view of the aircraft 100 is shown illustrating one example arrangement of sensor probes of the present disclosure. The wing assembly 104 may include a first wing portion 104*a* extending from the fuselage 102. The wing assembly 104 may include a second wing portion 104*b* extending from the fuselage 102 opposite the first wing portion 104*a*. The first wing portion 104*a* has a first wing portion underside 105*a* and a first wing portion leading edge 107*a*. The second wing portion 104*b* has a second wing portion underside 105*b* and a second wing portion leading edge 107*b*. Also shown in FIG. 1B is a first node coupling 101*a* and a second node coupling 101*b*. The first and second node couplings 101*a*, 101*b* may be electrical couplings, conduits, or other electrical or communications lines than span at least a portion of the wing assembly 104.

The sensor probes 108*a*-108*h* may be coupled to the aircraft 100 at the wing assembly 104. For example, the sensor probes 108*a*-108*d* may collectively define a first subset of sensor probes that are connected to the first wing portion 104*a*. The first subset of sensor probes may be attached to the first wing portion underside 105*a* and extend elongated from the first wing portion leading edge 107*b*. In the example of FIG. 1B, the fourth sensor probe 108*d* extends a first length 109*a* from the first wing portion leading edge 107*a*, and one or more or all of the sensor probes 108*a*-108*c* extend a second length 109*b* from the first wing portion leading edge 107*a*. The first node coupling 101*a* may be operative to electrically and/or communicatively couple each of the sensor probes of the first subset (108*a*-108*d*) to electronics of the fuselage 102, including with components associated with the acoustic detection and avoidance system described herein. The sensor probes 108*e*-108*h* may collectively define a second subset of sensor probes that are connected to the second wing portion 104*b*. The second subset of sensor probes (108*e*-108*h*) may be arranged with the second wing portion 104*b* in manner substantially analogous to the arrangement of the first subset of the sensor probes 108*a*-108*d*.

In the example of FIGS. 1A and 1B, the sensor probes 108*a*-108*h* extend substantially perpendicularly from the first wing portion leading edge 107*a* or the second wing portion leading edge 107*b*, respectively. In other arrangements, one or more of the sensor probes 108*a*-108*h* may extend at a different angle from the first or second wing portions 107*a*, 107*b*. Sample angles include at least 85°, at least 75°, at least 65°, at least 55°, at least 45°, or less than 45° from the leading edge 107*a*, 107*b*. More generally, the sensor probes 108*a*-108*h* may extend at any appropriate angle so as to face into the airflow or be otherwise capable of rotating into the flow during use. In some cases, an actuator 133 may be provided to facilitate direction control of an internal microphone assembly of a given probe. Further, one or more of the sensor probes 108*a*-108*h* may be mounted to portions of the aircraft 100 other than the underside of the wing assembly 104. For example, one or more of the sensor probes 108*a*-108*h* may be connected to a top surface of the wing assembly, the fuselage 102, the tail 103, and so on. Connecting the sensor probes 108*a*-108*h* at a variety of different orientations and positions may enhance the range of acoustic signals and associated data that can be detected and analyzed by the detection and avoidance system. For example, detecting an acoustic signal from an intruder at multiple different positions (as detected via the sensor probes 108*a*-108*h*) may enhance a resolution of the system and contribute to more accurate determination of the positional coordinates of the intruder.

Figure 2:
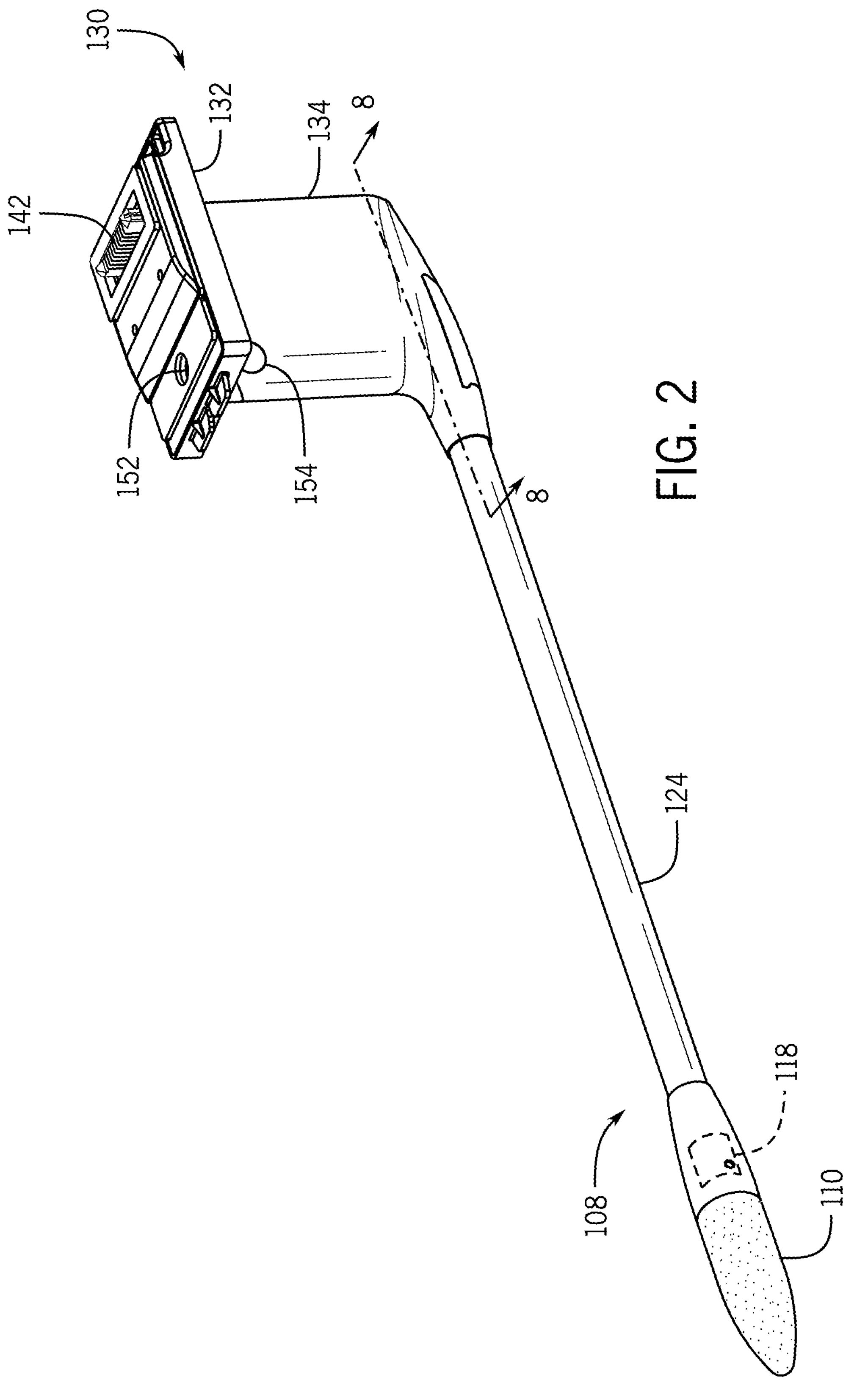
FIG. 2 depicts an isometric view of a sensor probe and a breakaway mechanism.
Figure 3:
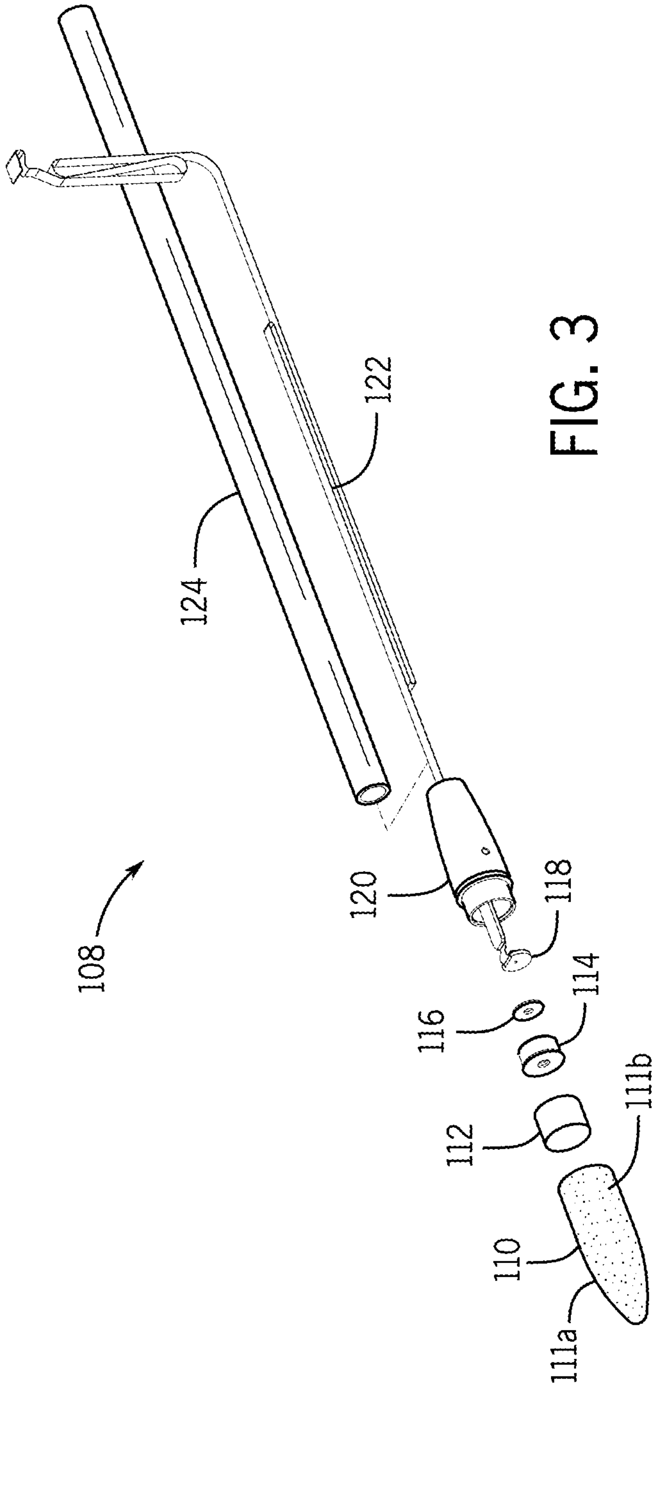
FIG. 3 depicts an exploded view of the sensor probe of FIG. 2.

The sensor probes 108*a*-108*h* may be releasably coupled to the wing assembly 104 using a breakaway mechanism 130, as shown in FIG. 2. One such breakaway mechanism is described in U.S. Patent Application No. 63/082,832, entitled "STRUCTURES TO LIMIT COLLISION DAMAGE FOR AIRCRAFT," of which is incorporated by reference herein. The breakaway mechanism of FIG. 2 includes a base 132 and a blade 134 that is releasable coupled to the base 132. That base may define a housing that is substantially rigidly connected to the wing assembly 104. The blade 134 may define an aerodynamic component that defines a mounting for the sensor probe 108*a*, as described in greater detail below with respect to FIG. 8. The sample breakaway mechanism 130 may include a connecting feature 152, such as a glass-filled nylon bolt. The connecting feature 152 may extend substantially through the base 132 and the blade 134. A thread insert 154 is provided, which may be a nut, a catch, or other securing feature, including a feature having threads, that is configured to receive the connecting feature 152 substantially within the blade 134. In the engaged configuration of FIG. 2, the connecting feature 152 may secure the blade 134 and the base 132 relative to one another. The connecting feature 152 may be constructed as a sacrificial component such that the blade 134 (and associated sensor probe 108 may separate from the aircraft 100 upon receipt of a threshold force. The breakaway mechanism 130 may also include a coupling node 142. The coupling node 142 is an electrical component that establishes an electrical coupling between the sensor probe 108*a* and electrical components of the aircraft 100. The coupling node 142 may include electrical connectors, including pins, conductors, or other features that may be used to establish an electrical connection. In other examples, the sensor probes 108*a*-108*h* may be connected to the wing assembly 104 without the breakaway mechanism 130. For example, the sensor probes 108*a*-108*h* may be substantially rigidly connected to the wing assembly 104 or other portion of the aircraft 100. For purposes of illustration, a sample implementation of the first sensor probe 108*a* is presented below. It will be appreciated that the sensor probes 108*b*-108*h* may be substantially similar, with changes in mounting location and/or length. The sensor probe 108*a* includes a nosecone 110. With reference to FIGS. 3 and 6, the nosecone 110 may include a forward section 111*a* and a rear section 111*b*. The forward section 111*a* may define a forward-most portion of the sensor probe 108*a*. The forward section 111*a* may be constructed to encounter flow and mitigate drag on the aircraft 100 during operation. For example, the forward section 111*a* may define a dome-shaped tip 158 of the nosecone 110. The dome-shaped tip 158 may define a substantially conical contour of the nosecone 110. In other cases, the dome-shaped tip 158 may define a more angular contour. Extending from the dome-shaped tip 158 of the nosecone 110 is a conical transition portion 160. The conical transition portion 160 may define an angular or sloped transition of the nosecone 110 between the dome-shaped tip 158 and the rear section 111*b* of the nosecone 110. For example, the conical transition portion 160 may be generally defined by a substantially frustoconical shape with an exterior contour that allows the sensor probe 108*a* to gradually part the air during operation of the aircraft 100.

The rear section 111*b* of the nosecone 110 may extend from the forward section 111*a* of the nosecone 110. The rear section 111*b* may define a body of the nosecone 110 that may be used to house electrical components of the nosecone 110. For example, the rear section 111*b* may include a cylindrical portion 162. The cylindrical portion 162 may define a substantially constant exterior contour that is generally in line with the direction of flow encountered by the sensor probe 108*a*. For example, the cylindrical portion 162 may define a substantially constant exterior contour that is generally parallel to a centerline of the sensor probe 108*a*. The rear section 111*b* may also define a mount region 164. The mount region 164 may be a recessed feature that extends at least partially into the body of the nosecone 110 at the rear section 111*b*. The mount region 164 may define a seat for one or more internal components of the sensor probe 108*a*, including for various microphone assemblies and associated components.

The nosecone 110 may be an integrally constructed or otherwise one-piece component. The rear section 111*b* may extend continuously from the forward section 111*a*. The dome-shaped tip 158, the conical transition portion 160, and the cylindrical portion 162 may cooperate with one another to define a smooth, continuous aerodynamic shape and contour from the forward-most portion of the sensor probe 108*a*. The continuous aerodynamic contour may limit drag on the aircraft 100 by mitigating abrupt transitions in air flow along the nosecone 110, such as mitigating abrupt transition along an interface between the dome-shaped tip 158 and the conical transition portion 160 and/or along an interface between the conical transition portion 160 and the cylindrical portion 162.

The nosecone 110 may include a barrier material 113. In some cases, the nosecone 110 may be substantially entirely constructed of the barrier material 113. In these instances, the barrier material 113 may act to both define the structure of the nosecone 110, as well as to transmit acoustic signals while minimizing generation of noise, including selectively attenuating unwanted signals. For example, a portion of the barrier material 113 can include an acoustically transparent material or other material that is substantially transparent to audio signals of interest. The nosecone 110 may thus selectively attenuate unwanted signals (noise) and provide an acoustic path that minimizes the production of additional unwanted signals or the distortion of the unwanted signals. In one example, the barrier material 113 may be a porous, hydrophobic plastic. Porex® manufactured by the Porex Corporation of Atlanta, Georgia may be used. Pores 161 may be defined throughout the acoustically transparent material. The pores 161 may define a tortuous path for flow through the nosecone 110. In some cases, the pores 161 may be substantially evenly spaced through the barrier material 113, but in other embodiments may be defined irregularly. The various pores 161 and other structure may be configured to prevent impact of direct flow on the microphone, as well as orient air flow such that noise generated by the airflow may not impact the desired sound frequencies to be detected by the microphone (e.g., 0 to 500 Hz). In this manner, the nosecone 110 may be configured to reduce broadband noise variations, and the pores can help stabilize flow before it reaches the microphone. The reduction in noise may help enhance the detection of the desired acoustic signals, allowing for a more precise detection of intruders.

The porous, hydrophobic plastic may also be generally configured to prevent entry of moisture into a body of the nosecone 110. For example, the various internal pathways defined by the pores and void regions of the barrier material 113 may impede or prevent the passage of moisture through the nosecone 110. The combination of acoustic transparency and a moisture barrier may allow the nosecone to shield internal components of the sensor probe 108*a* from the contaminants of an external environment, while allowing the internal components, including a microphone device, to be acoustically exposed to the external environment for acoustic signal detection. The nosecone 110 may also be constructed to shield ultraviolet radiation.

Other materials and constructions of the nosecone 110 are contemplated as well. For example, a portion of the nosecone 110 may be constructed of a solid plastic with a fine stainless steel mesh. Additionally or alternatively, a portion of the nosecone 110 may be constructed of a solid plastic with a fabric mesh. Additionally or alternatively, a portion of the nosecone 110 may be constructed with a foam. In other examples, other materials are possible, including constructing the nosecone 110 from multiple different materials. In many embodiments, the construction of the nosecone 110 is selected to reduce the impact of flow angles on the microphone, while also preventing water and debris from reaching the microphone sensor.

The sensor probe 108*a* may also include an intermediary media 112. The intermediary media 112 may operate to filter incoming airflow, and/or selectively attenuate, or dampen a signal propagated through the nosecone material. The intermediary media 112 can include a foam, a tortuous path filter, precision woven fabric, and so on. The shape, texture, material of the intermediary media 112 may be tuned to induce certain audial properties within the sensor probe 108*a*, for example, by attenuating acoustic signals that travel through the intermediary media 112 to a specified degree. The intermediary media 112 may be a polyurethane foam. The intermediary media 112 may be generally cylindrically shaped.

Figure 4A:
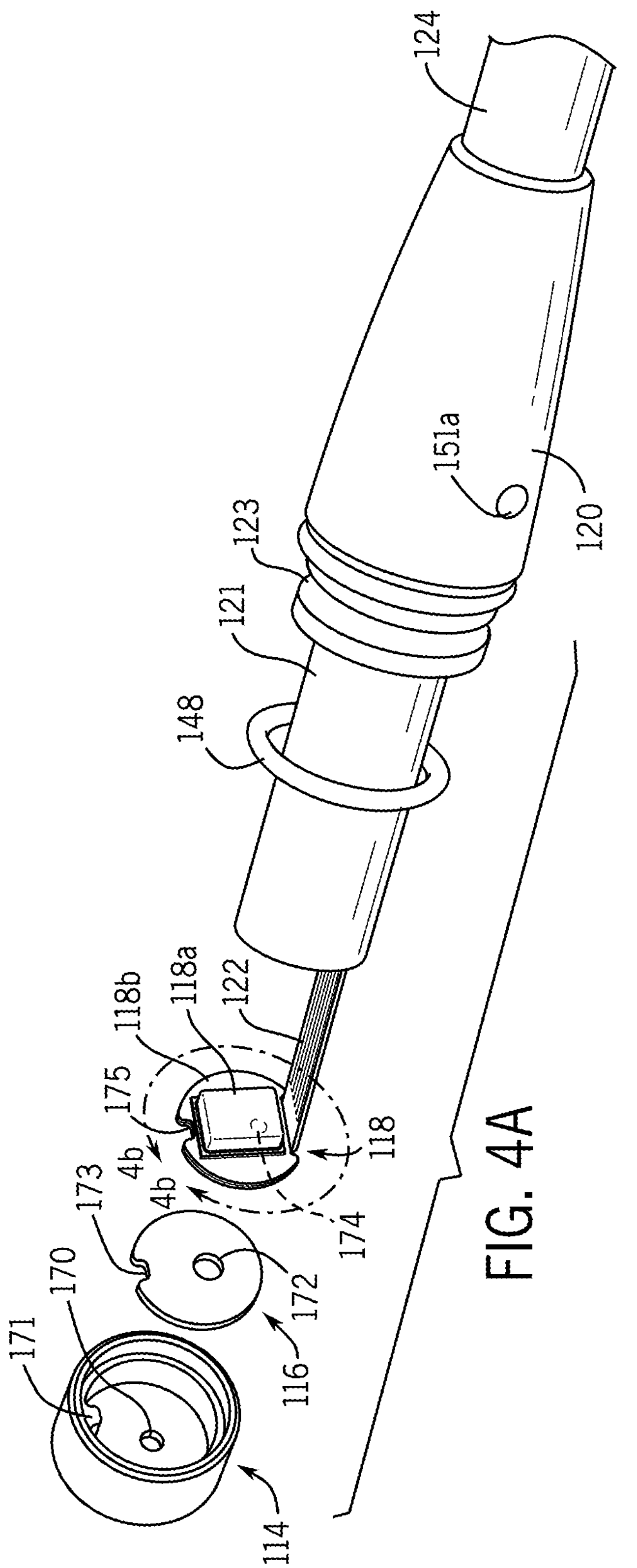
FIG. 4A depicts another exploded view of the sensor probe, including a microphone assembly.
Figure 4B:
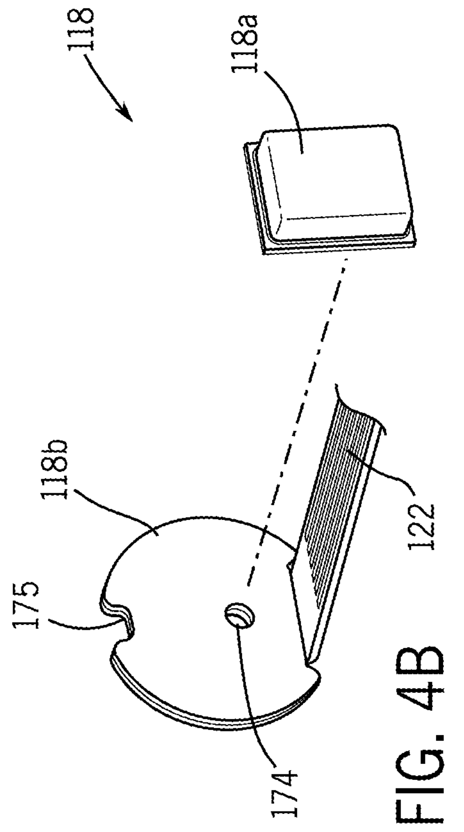
FIG. 4B depicts detail 4B-4B of FIG. 4A, including an exploded view of the microphone assembly of FIG. 4A.

With reference to FIGS. 4A and 4B, the sensor probe 108*a* may also include a microphone assembly mount 114. The microphone assembly mount 114 may define a mounting structure for internal components and sensors of the sensor probe 108*a*. The microphone assembly mount 114 may be defined by a cylindrical and hollow body that is substantially closed at one end. At the closed end, the microphone assembly mount 114 may include a mount aperture 170 extending therethrough. The microphone assembly mount 114 may also include a mount alignment feature 171. The mount alignment feature 171 may be a notch, protrusion, or other element that extends in an interior or hollow region of the microphone assembly mount 114.

An adhesive 116 or other fastening element may also be provided with the sensor probe 108*a*. The adhesive 116 may be a double sided adhesive having sufficient bonding characteristics to structurally mount electrical components within the sensor probe 108*a* such that the electrical components maintain their positioning during operation of the aircraft 100. The adhesive 116 may also be weather resistant, immune to pressure differentials or changes, and/or otherwise be configured to maintain adhesiveness during operation of the aircraft 100. The adhesive 116 may also be contoured for arrangement within the sensor probe 108*a*. For example, the adhesive 116 may include an adhesive aperture 172 and an adhesive alignment feature 173.

The sensor probe 108*a* may be configured to detect acoustic signals using a microphone assembly 118. The microphone assembly 118 may include a microphone device 118*a* and a stiffener structure 118*b*. The microphone device 118*a* may include any appropriate audio sensor, such as one or more omnidirectional microphones, directional microphones, or the like and so on that are configured to detect an acoustic signal through the barrier material 113. While many constructions are possible, the microphone device 118*a* may include a windscreen or barrier layer, a diaphragm, a coil, a magnetic core, a capsule or other device to transform a vibration to an electric signal, and/or an output for transmitting said electrical signal, among other components. The stiffener structure 118*b* may be a plate, rod, base or other structure that provides rigidity to the microphone device 118*a*. The stiffener structure may include a stiffener aperture 174 and a stiffener alignment feature 175.

A nosecone mount 120 is also provide with the sensor probe 108*a*. The nosecone mount 120, as shown with respect to FIGS. 4A and 5, includes a nosecone seat 121. The nosecone seat 121 may be an elongated member or tube that extends in a direction toward a distal end of the sensor probe 108*a*. The nosecone mount 120 may further include a groove 123. The groove 123 may be channel that forms a ring adjacent the nosecone seat 121. A sealing element 148, such as an O-ring, U-cup, or other compressible seal, may be provided and seatable substantially within the groove 123. The nosecone mount 120 may also define a cavity 150 (shown in phantom in FIG. 5). The nosecone mount 120 may further include an entrance port 151*a* and a bleed port 151*b*. The entrance port 151*a* may extend into the cavity 150 from an exterior surface of the nosecone mount 120 and be configured to receive a bonding substance such as glue. The bleed port 151*b* may extend from the cavity 150 to the exterior surface and be configured to emit excess bonding substance from the cavity 150.

The sensor probe 108*a* may also include an elongated member 124. The elongated member 124 may be a tube that has a hollow interior. The elongated member 124 may extend elongated a sufficient distance to separate components of the sensor assembly 108*a* from a portion of the aircraft 100. The elongated member 124 may have sufficient rigidity in order to dampen an oscillation of the sensor probe 108*a* relative to the wing assembly 104, the fuselage, and/or other portion of the aircraft 100. A flex harness 122 is also provided. The flex harness 122 may include an electrical coupling, including housing various conductors, that extends along an elongated distance. The electrical coupling may be substantially flexible and manipulateable without substantially damaging or interrupting an electrical signal carried by the flex harness 122.

Figure 6A:
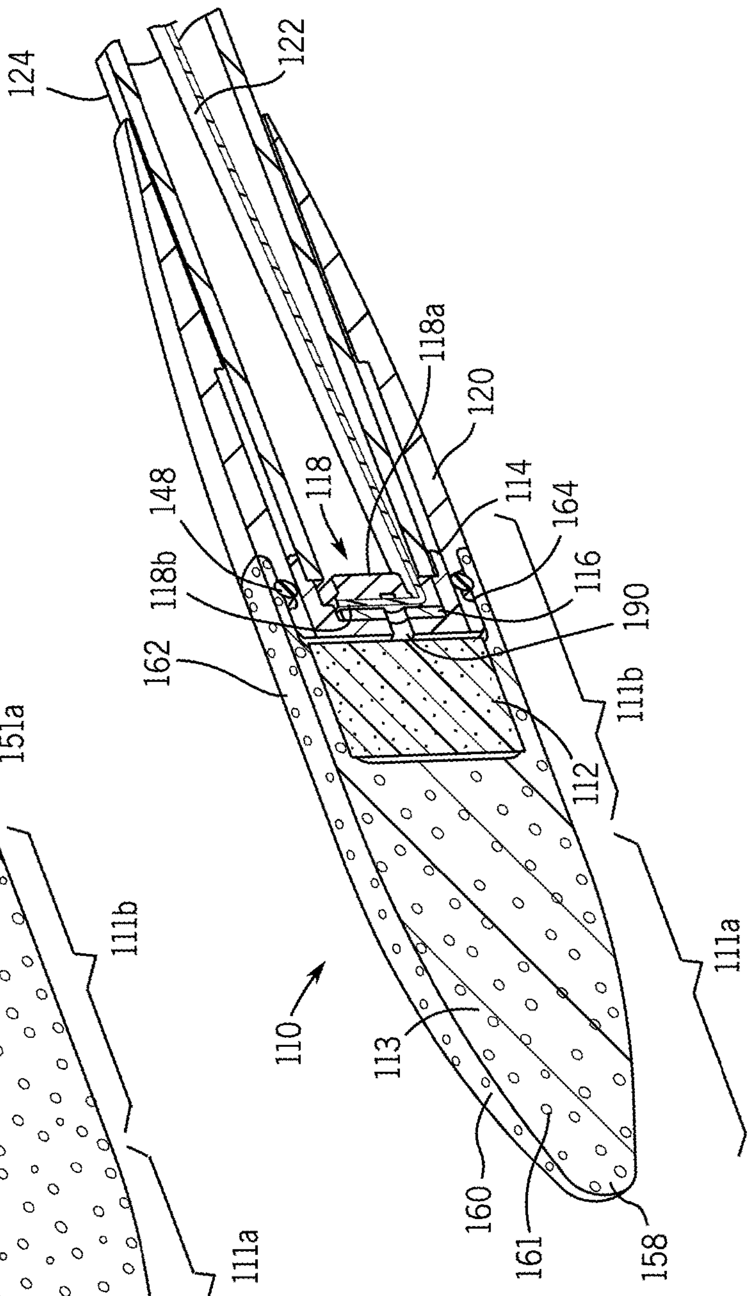
FIG. 6A depicts a cross-sectional view of the nosecone of FIG. 4, taken along line 6-6 of FIG. 5.

The sensor probe 108*a* may be coupled such that microphone assembly 118 is secured downstream of the nosecone 110. The mount region 164 of the nosecone 110 may at least partially receive the microphone assembly 118 at the rear section 111*b*, as shown in FIG. 6A. This may position the microphone assembly 118 downstream of the forward section 111*a* of the nosecone 110 and barrier material 113 contained therein. The at least partially receipt of the microphone assembly 118 by the nosecone 110 may also help define an environmental shield between the microphone assembly 118 and an external environment of the sensor probe 108*a*. Where implemented, the intermediary media 112 may also be received by the nosecone 110 at the mount region 164. In the example of FIG. 6A, the intermediary media 112 is arranged between the forward section 111*a* of the nosecone and microphone assembly 118.

Figure 7A:
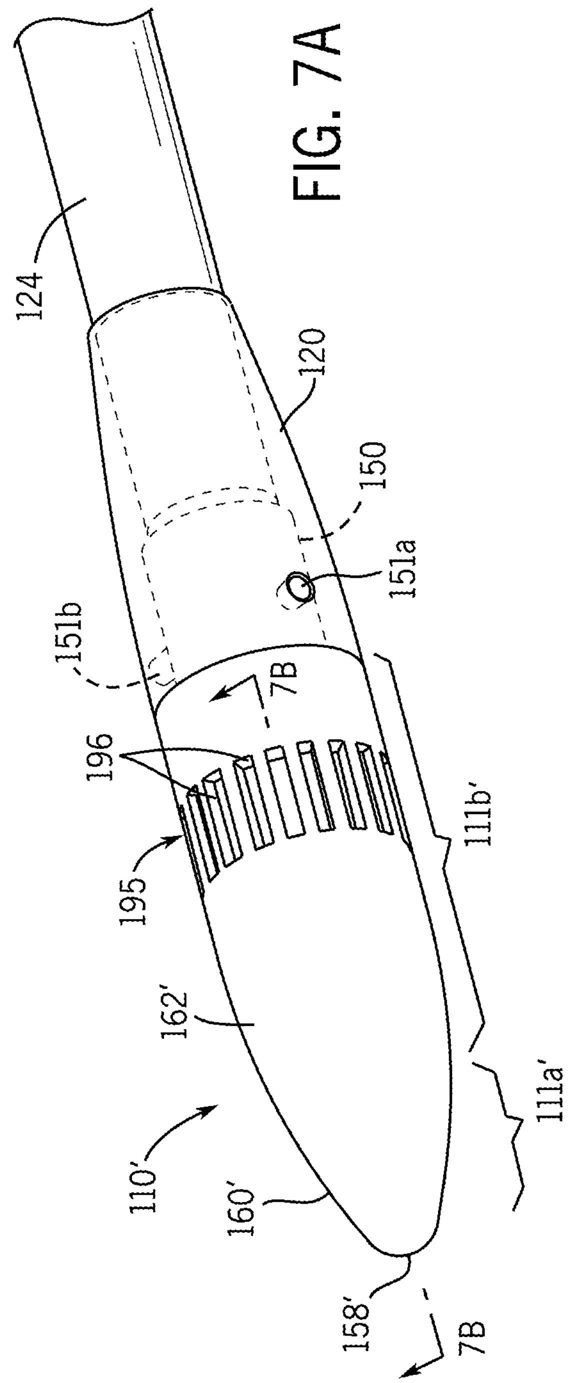
FIG. 7A depicts an isometric view of another example of a nosecone of the sensor probe of FIG. 3.

Other examples of the nosecone 110 are contemplated herein. For example and with reference to FIG. 7A, a nosecone 110' is shown. The nosecone 110' may be substantially analogous to the nosecone 110, and include a forward section 111*a'*, a rear section 111*b'*, a tip 158', a conical transition portion 160', and a cylindrical portion 162'. Notwithstanding the foregoing similarities, the nosecone 110' may include one or more apertures, such as a series of slits 195. The series of slits 195 may be circumferentially spaced about the nosecone 110' or otherwise defined through the nosecone to define a flow pathway between the external environment and the internal environment. The series of slits 195 is show as including a slit 196. The slit 196 may be a generally elongated opening extending along an axial direction of the nosecone 110'. For example, the slit 196 can extend elongated along a direction of travel of the aircraft 100. However, in other embodiments, the apertures may be shaped in other manners, such as slots, holes, or the like. The slit 196 may extend into or at least be in communication with the cavity 150 or other internal volume of the sensor probe 108*a*, such as that holding the microphone assembly 118. The direction and shape of the slit may be configured to reduce the impact of airflow in certain directions to assist with noise reduction. For example, a size and dimension of the slit 196 may be tuned based on various aerodynamic characteristics of the airflow.

With reference to FIGS. 4A and 4B, the microphone assembly 118 may also be coupled within the sensor probe 108*a* to orientate the microphone assembly 118 at a desired position. In one example, it may be desirable to arrange the microphone assembly 118 along a direction substantially perpendicular to a direction of flow encountered by the nosecone 110. To facilitate this arrangement, the microphone assembly mount 114 may be received within the mount region 164 of the nosecone 110 such that the substantially closed end of the microphone assembly mount 114 extends along the substantially circular cross-section of the rear section 111*b* of the nosecone 110. The adhesive 116 may be applied within the microphone assembly mount 114. The microphone assembly 118 may be seated on the adhesive 116 opposite the microphone assembly mount 114. The microphone assembly 118 may thus be secured along a direction along the substantially circular cross-section of the rear section 111*b* or otherwise a direction that is substantially perpendicularly to a direction of flow encountered by the nosecone 110. The flex harness 122 may be electrically coupled to the microphone assembly 118. The flex harness 122 may facilitate the orientation of the microphone assembly 118. For example, the flex harness 122 may extend from the microphone assembly 118 in a variety of configurations and arrangements without impairing the electrical connection. As shown in FIG. 4A, the flex harness 122 extends from the microphone assembly 118 and defines a substantially ninety degree turn before extending through the elongated member 124. The flex harness 122 may extend through the elongated member 124 and to the coupling node 142 (FIG. 2) and/or other electrical components of the aircraft 100 in order to electrically couple the microphone assembly 118 with various components and systems of the aircraft 100.

The microphone assembly 118 may also be coupled within the sensor probe 108*a* in order to define a rotational position of the microphone device 118*a*. In some cases, the microphone assembly mount may be configured to rotationally position the microphone assembly in response to a local flow angle of the airflow. The positioning can be active or passive. Additionally or alternatively, the microphone device 118*a* may be rigidly fixed to the stiffener structure 118*b*. The stiffener structure 118*b* may be received by the microphone assembly mount 114 such that the mount alignment feature 171 and the stiffener alignment feature 175 engage with one another. The mount alignment feature 171 and the stiffener alignment feature 175 may be complementary alignment features. For example, the mount alignment feature 171 may be a protrusion that prevents entry of the stiffener structure 118*b* into the microphone assembly mount 114 absent the alignment of the stiffener alignment feature 175 with the mount alignment feature 171. The adhesive alignment feature 173 may be similarly configured for receipt within the microphone assembly mount 114 at the proper rotational position.

The microphone assembly 118 may be rotationally aligned within the sensor probe 108*a* to define an acoustic corridor 190 that is offset from a centerline of the sensor probe 108*a* (e.g., FIGS. 4B and 6). The acoustic corridor 190 may define a path for acoustic signals in the sensor probe 108*a* that is a substantially void space. The acoustic corridor 190 may be defined in part by the mount aperture 170, the adhesive aperture 172, and the stiffener aperture 174. Rotationally aligning the microphone assembly mount 114, the adhesive 116, and the stiffener structure 118*b* allows the mount aperture 170, the adhesive aperture 172, and the stiffener aperture 174 to be aligned with one another to define a continuous, uninterrupted void space within the sensor probe 108*a* that leads to the microphone device 118*a*.

The nosecone mount 120 may also be utilized to couple the microphone assembly 118 in the sensor probe 108*a* in conjunction with the nosecone 110. For example, the nosecone 110 may be seated on the nosecone mount 120 and cooperate to house the microphone assembly 118 and associated components therein. In one configuration, the nosecone 110 is slid over the nosecone seat 121 and the groove 123 of the nosecone mount 120. For example, the nosecone seat 121 may be inserted into the mount region of the nosecone 110. The sealing element 148 may be seated in the groove 123 and define a friction fit with the nosecone 110 within the mount region 164. Glues and other adhesives may also be used to secure the nosecone 110 on the nosecone mount 120. In the engaged configuration, the nosecone 110 and the nosecone mount 120 may define a substantially continuous or uninterrupted contour to minimize drag as air flow traverses an external interface of the nosecone 110 and the nosecone mount 120.

Figure 5:
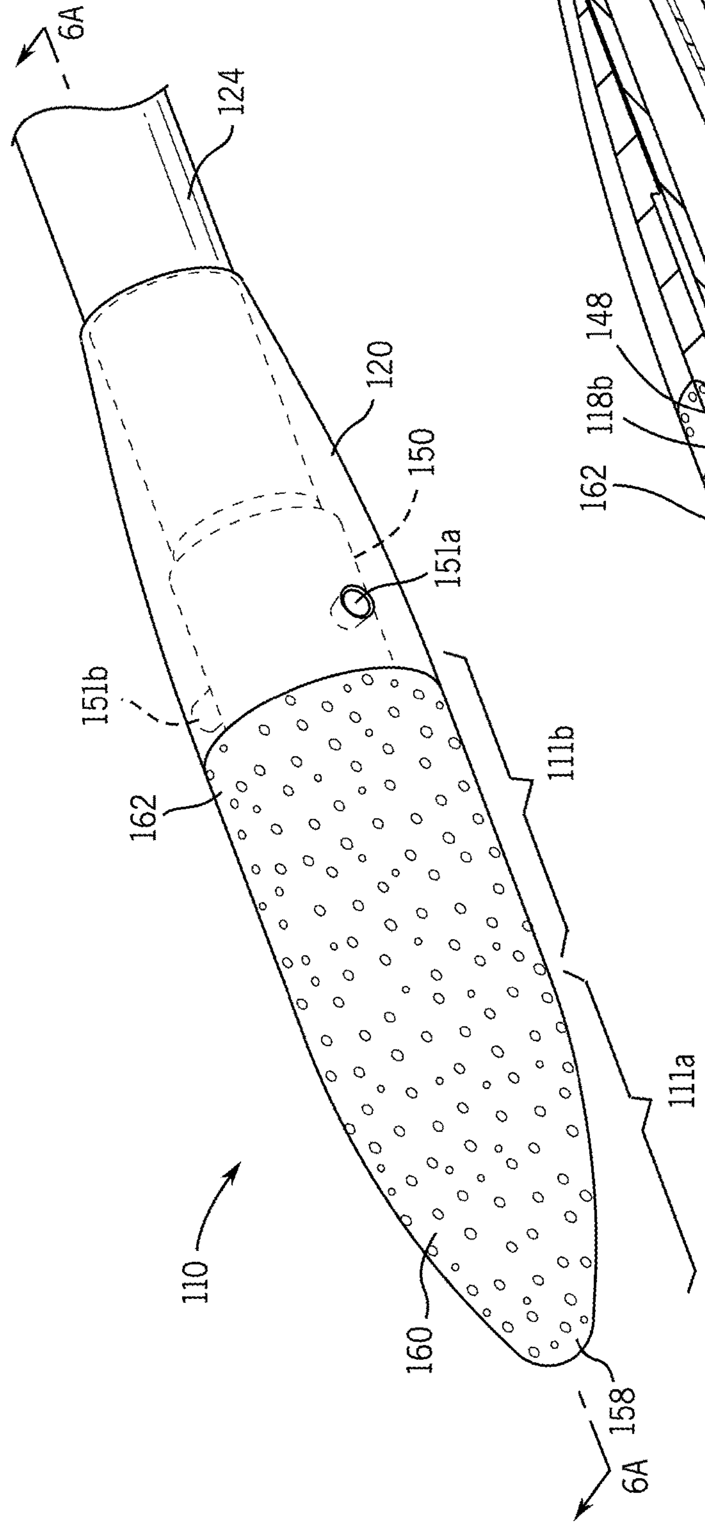
FIG. 5 depicts an isometric view of a nosecone of the sensor probe of FIG. 3.

The nosecone mount 120 may be coupled to the elongated member 124 using a bonding substance, such as glue. As shown in FIGS. 5 and 6, the elongated member 124 may be interested into the nosecone mount 120 opposite the nosecone 110. The elongated member 124 may extend into the cavity 150. A bonding substance may be introduced into the entrance port 151*a* in order to fill the cavity 150 and bond the elongated member 124 to the nosecone mount 120. Excess bonding substance may exit the cavity via the bleed port 151*b*.

Figure 8:
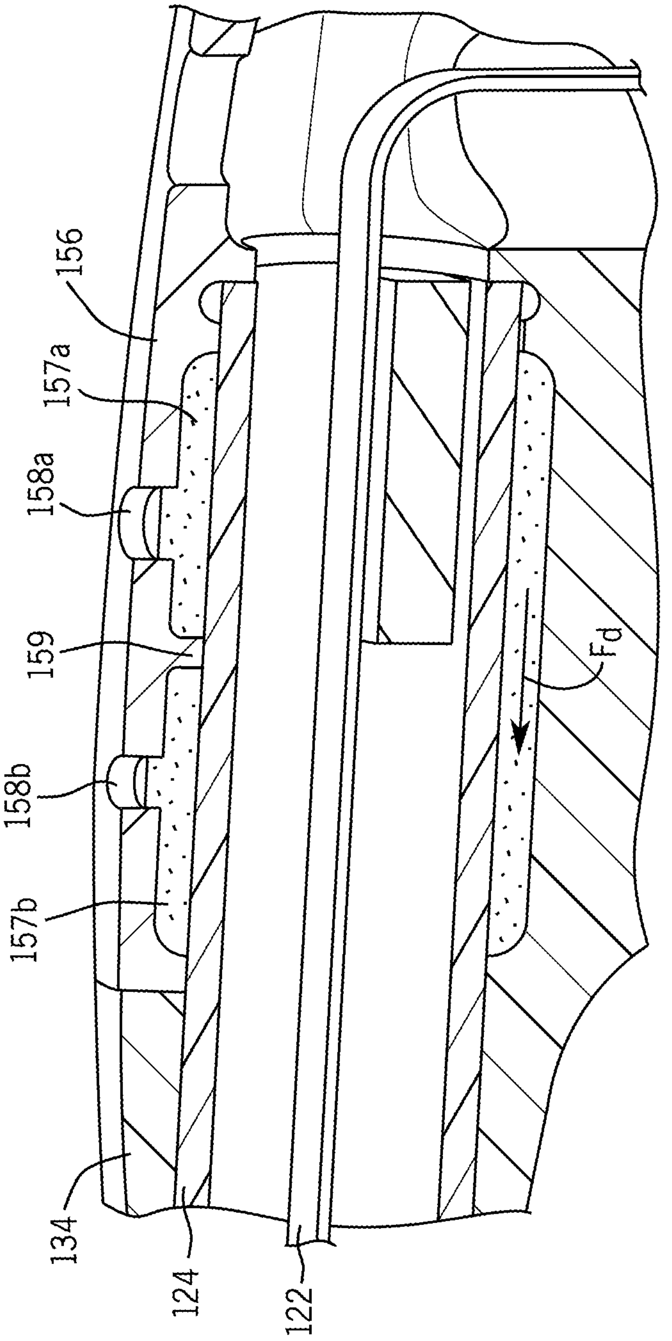
FIG. 8 depicts a cross-sectional view of the sensor probe and breakaway mechanism of FIG. 3, taken along line 8-8 of FIG. 3.

The sensor probe 108*a* may be coupled to the aircraft 100 via the breakaway mechanism 130. FIG. 8 shows in an example implementation in which the elongated member 124 (and associated sensors) is coupled to the blade 134 of the breakaway mechanism 130. The elongated member 124 may be inserted into the blade 134 at a proximal end of the sensor probe 108*a* opposite the nosecone 110. The elongated member 124 may extend into the blade 134 and reach a first filled cavity 157*a* and a second filled cavity 157*b* defined within the blade 134. The first and second cavity 157*a*, 157*b* may be partially defined by a closeout 156 of the blade 134. The closeout 156 may be a contoured plate that define a wall of the blade 134 and includes a division 159 extending into the blade 134 that separates the first filled cavity 156*a* and the second filled cavity 157*b* from one another. The closeout further includes an injection port 158*a* and a bleed port 158*b* extending therethrough. The injection port 158*a* may be configured to receive the bonding substance and introduce the bonding substance into the first filled cavity 157*a*. The bonding substance may proceed along a filling direction Fd and into the second filled cavity 157*b*. Excess bonding substance may be emitted through the bleed port 158*b*. The bonding substance may be cured to fix the elongated member 124 within the blade 134.

In operation, the sensor probe 108*a* may be configured to detect acoustic signals. For example, the nosecone 110 may be configured to receive a flow of air that is associated with an acoustic signal, such as that from an intruder.

Figure 10:
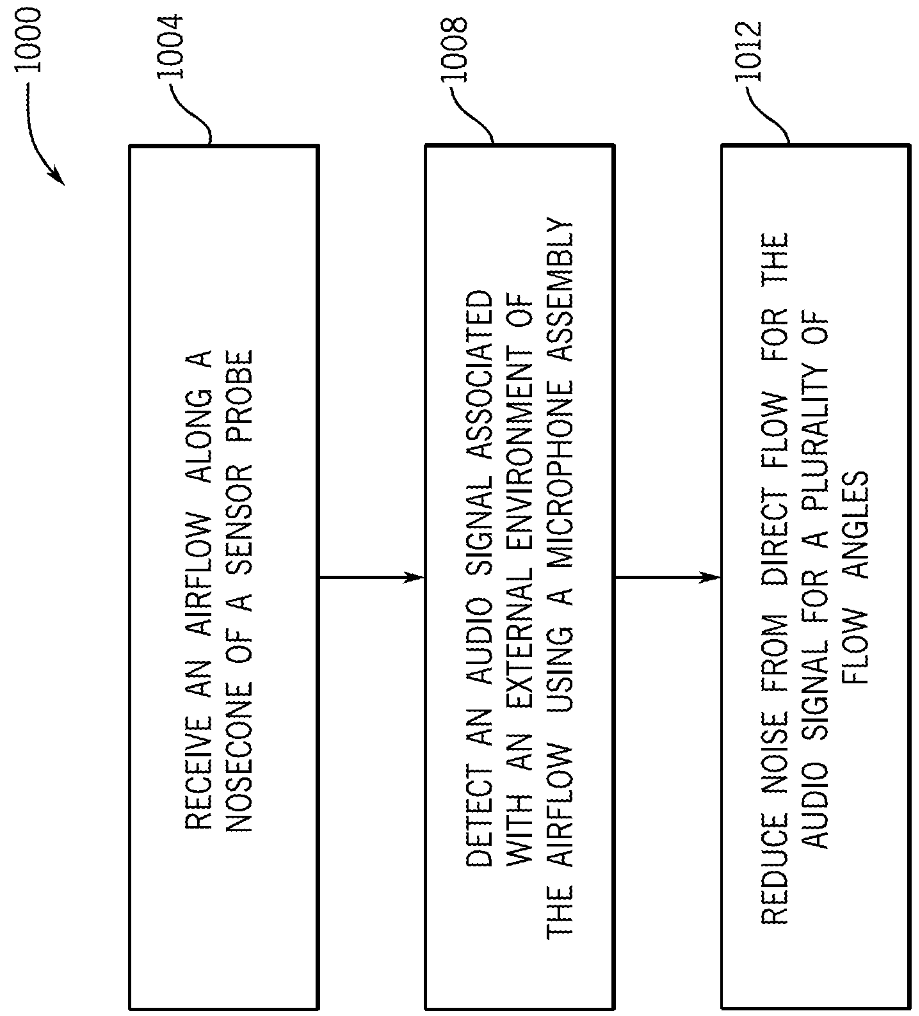
FIG. 10 depicts a flow diagram for detecting an audio signal using a sensor probe.

The sensor probe 108*a* may also operate to detect audio signal and limit the impact of noise or other unwanted signals during the detection. With reference to the flow diagram of FIG. 10, a process 1000 is depicted for detecting an audio signal using a sensor probe, such as the sensor probe 108*a*. At operation 1004, airflow is received along a nosecone of a sensor probe. For example and with reference to FIG. 1A, airflow may be received along the nosecones 110, 110' of any of the sensor probes 108*a*-108*h*. At operation 1008, an audio signal associated with an external environment of the airflow is detected using a microphone assembly. For example and with reference to FIGS. 3 and 4A, the microphone assembly 118 may detect audio signals associated with the external environment of the airflow. At operation 1012, noise or other unwanted signals from direct flow for the audio signal are reduced for a plurality of local flow angles. For example and with reference with FIGS. 5-7B, the nosecones 110, 110' can be configured to shield the microphone assembly 118 from the noise or other unwanted audio signals, such as the audio signals generated by the operation of the aircraft 110.

Figure 7B:
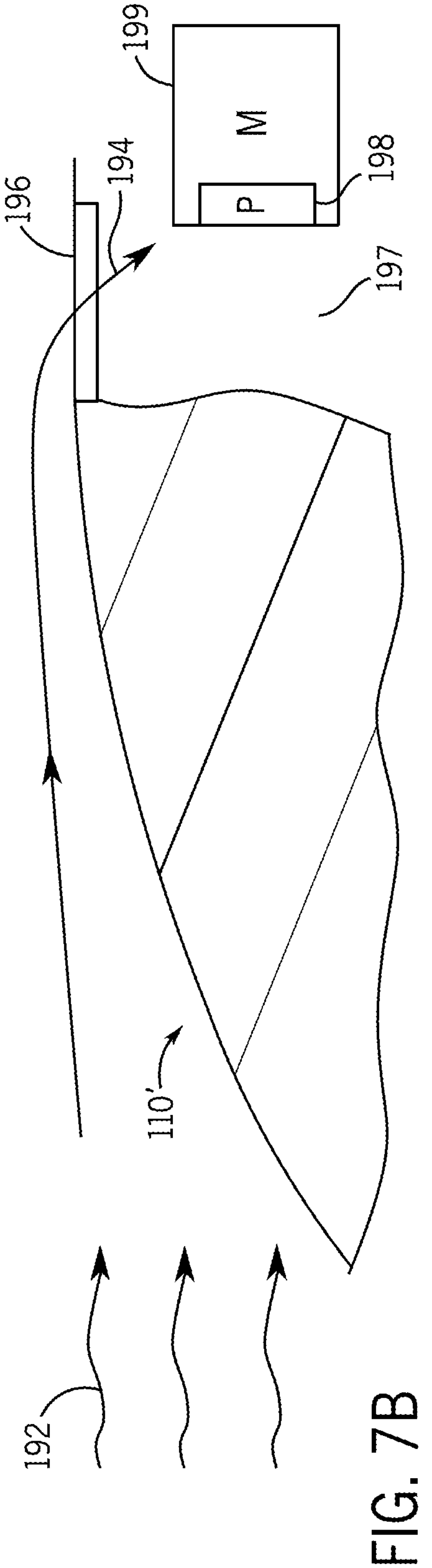
FIG. 7B depicts a schematic cross-sectional view of FIG. 7A, taken along line 7A-7A of FIG. 7A.

In one example and as shown in FIG. 7B, the nosecone 110' may define a shield between direct incoming flow 192 and a microphone assembly 199. As shown schematically in FIG. 7B, the microphone assembly 199 may have a portion 198 that is configured to receive audio signals. The microphone assembly 199 and the portion 198 may be arranged within an internal volume 197 at least partially defined by the nosecone 110'. The nosecone 110' may be configured to remove or otherwise mitigate the directional aspect of the incoming direct flow 192. For example, the nosecone 110' may guide the flow 192 along the nosecone 110 and block direct entry of the flow 192 into the internal volume 197. The slits 196 may be arranged on the nosecone 110 to allow target audio signals 194 (e.g., from an intruder) into the cavity 197 for receipt by the portion 198. The slits 196 may be positioned on the nosecone 110' so that the flow 192 transitions or separates from the nosecone 110' downstream of the nosecone 110'.

Figure 6B:
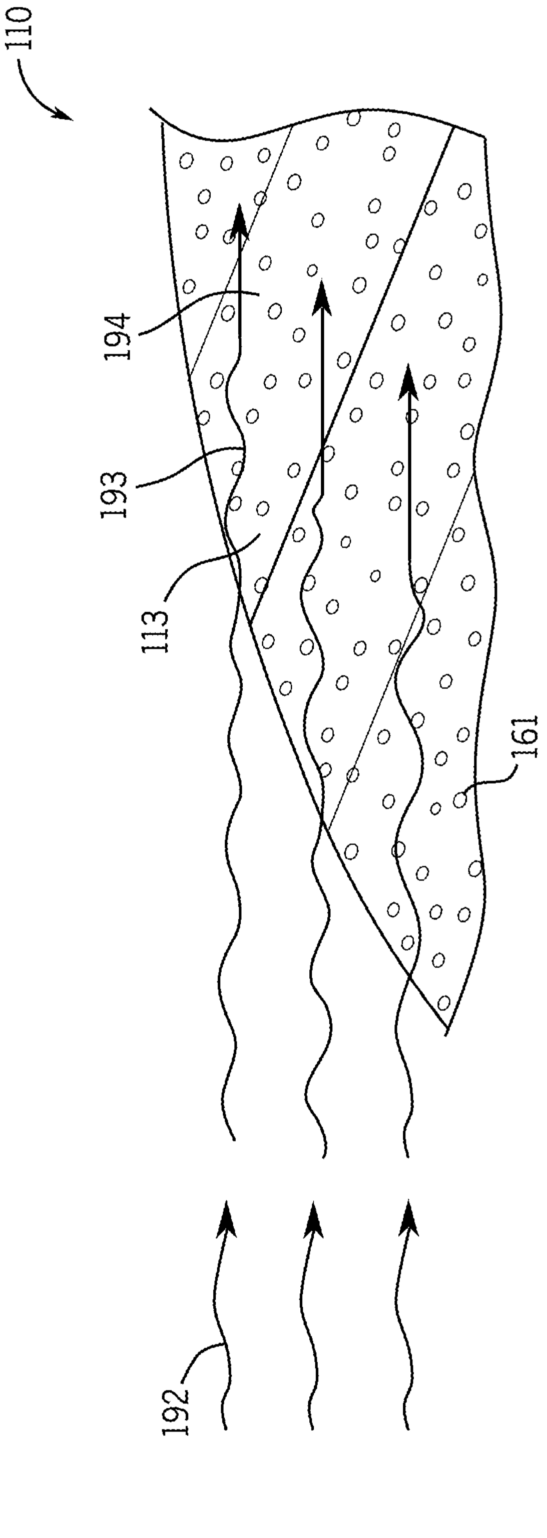
FIG. 6B depicts a schematic detail view of FIG. 6A.

Additionally or alternatively, an acoustically transparent material or other portions of the nosecone can be used to facilitate the reduction of noise. For example and with reference to FIG. 6B, the barrier material 113 may receive the incoming flow 192. The barrier material 113 may be substantially transparent to audio signals of interest (e.g., audio produced by intruders). The barrier material 113 can thus selectively attenuate signals unwanted signals (noise) and provide an acoustic path that minimizes the production of additional unwanted signals or the distortion of the unwanted signals. As shown in FIG. 6B, the incoming flow 192 can be filtered at a filtered section 193 to remove the unwanted noise. the target audio signals 194 can continue through the nosecone 110 for subsequent detection by one or more microphone assemblies of the sensor probe 108*a*.

Other examples and implementations are within the scope and spirit of the disclosure and appended claims. For example, features implementing functions may also be physically located at various positions, including being distributed such that portions of functions are implemented at different physical locations. Thus, the foregoing descriptions of the specific examples described herein are presented for purposes of illustration and description. They are not targeted to be exhaustive or to limit the examples to the precise forms disclosed. It will be apparent to one of ordinary skill in the art that many modifications and variations are possible in view of the above teachings.

What is claimed is:

1. An aerial vehicle comprising:

an aircraft sensor probe to detect an audio signal, the aircraft sensor probe comprising:

a nosecone including a tip and a body portion, wherein a diameter of the body portion of the nosecone is smaller than a length of the nosecone and the nosecone is configured to mitigate drag of the sensor probe in an airflow;

a mount assembly downstream of the nosecone and positioned rearward of the tip and including a mount aperture in fluid communication within an external environment of the sensor probe and configured to direct airflow from the external environment rearward;

a microphone positioned downstream of the mount assembly and secured in a perpendicular orientation relative to a direction of airflow exiting the mount aperture; and an acoustic corridor to transmit the audio signal extending from an opening at an external environment of the sensor probe to the microphone via the mount aperture, wherein the opening is defined by a side of the nosecone.

2. The aircraft sensor probe of claim 1, further comprising an intermediary filtering media arranged between the external environment and the microphone.

3. The aircraft sensor probe of claim 2, wherein the intermediary filtering media is a fabric.

4. The aircraft sensor probe of claim 2, wherein the intermediary filtering media is porous.

5. The aircraft sensor probe of claim 1, wherein the nosecone comprises a hydrophobic material.

6. The aircraft sensor probe of claim 1 further comprising:

a flexible wiring harness electrically coupled to the microphone, wherein the flexible wiring harness electrically couples the microphone to the aerial vehicle.

7. The aircraft sensor probe of claim 1, wherein the microphone assembly mount is defined by a cylindrical and hollow body that is at least partially closed at one end, the mount aperture extending through the one end.

8. The aircraft sensor probe of claim 1, further comprising:

an elongated member having a hollow interior extending from the aerial vehicle and coupled to the aircraft sensor probe;

wherein the elongated member dampens oscillation of the aircraft sensor probe relative to the aircraft.

9. The aircraft sensor probe of claim 8, further comprising:

a nosecone mount coupled to a distal end of the nosecone, wherein a sealing element is positioned between the nosecone mount and the nosecone; and wherein the nosecone mount is coupled to an end of the elongated member opposite the aerial vehicle.

10. An aircraft sensor probe to detect an audio signal comprising:

a nosecone including a tip and a body portion, wherein a diameter of the body portion of the nosecone is smaller than a length of the nosecone and the nosecone is configured to mitigate drag of the sensor probe in an airflow;

a mount assembly downstream of the nosecone defining a mount aperture extending therethrough;

an audio sensor coupled to the mount assembly and positioned rearward of the tip and downstream of the nosecone;

an acoustic corridor to transmit the audio signal extending from an external environment of the sensor probe to the audio sensor;

an opening defined by the nosecone and fluidly coupled with the acoustic corridor;

an intermediary media positioned at the acoustic corridor arranged between the nosecone and the audio sensor; and wherein the sensor probe receives the airflow for a plurality of local flow angles and reduces noise from direct flow for the audio signal.

11. The aircraft sensor probe of claim 10, wherein the mount assembly positions the audio sensor in a perpendicular orientation to a direction of the airflow encountered by the nosecone.

12. The aircraft sensor probe of claim 10, wherein the opening is defined along an exterior of the nosecone.

13. The aircraft sensor probe of claim 10, wherein the opening is configured reduce an impact of airflow to assist with noise reduction.

14. The aircraft sensor probe of claim 10, wherein:

the intermediary media is a fabric; and the intermediary media at least one of filters the airflow or selectively attenuates the audio signal.

15. The aircraft sensor probe of claim 10, wherein the nosecone may guide the airflow along the nosecone to limit direct entry of the airflow into the acoustic corridor.

16. The aircraft sensor of claim 10, wherein a direction or shape of the opening is configured to reduce an impact of airflow in certain directions to assist with noise reduction.

17. An aircraft comprising:

a fuselage;

a first wing extending from the fuselage;

a second wing extending from the fuselage opposite the first wing;

a propeller; and one or more sensor probes to detect an audio signal comprising:

a nosecone including a tip and a body portion, wherein the nosecone is configured to mitigate drag of the sensor probes in an airflow, an audio sensor positioned rearward of the tip and downstream of the nosecone, an acoustic corridor to transmit the audio signal extending from an opening at an external environment of the sensor probes to the audio sensor, and a mount assembly downstream of the nosecone and defining a mount aperture extending therethrough, the microphone assembly mount coupled with the audio sensor.

18. The aircraft of claim 17, wherein the one or more sensor probes further comprise:

an intermediary filtering media positioned at the acoustic corridor and arranged between the nosecone and the audio sensor, and wherein the intermediary media is a fabric.

19. The aircraft of claim 17, wherein:

the one or more sensor probes include a first sensor probe and a second sensor probe;

the first sensor probe extends from a leading edge of the first wing; and the second sensor probe extends from a leading edge of the second wing.

20. The aircraft of claim 17, wherein:

the audio sensor is positioned distal to the microphone mount; and the mount aperture at least partially defines the acoustic corridor.

* * * * *